(12) United States Patent
Kochale

(10) Patent No.: US 6,804,450 B1
(45) Date of Patent: Oct. 12, 2004

(54) METHOD AND APPARATUS FOR REVERSE PLAYBACK OF A DIGITAL DATA

(75) Inventor: Axel Kochale, Springe (DE)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/573,658

(22) Filed: May 18, 2000

(30) Foreign Application Priority Data

May 29, 1999 (EP) .............................. 99110450

(51) Int. Cl.⁷ ............................ H04N 9/79; H04N 5/91; H04N 5/781

(52) U.S. Cl. ................ 386/68; 386/6; 386/7; 386/8; 386/70; 386/125

(58) Field of Search ........................... 386/68, 125, 46, 386/80, 81, 111, 112, 126, 82, 33, 40, 45, 94, 95, 124; 369/47–48; 725/88–91; 348/384

(56) References Cited

U.S. PATENT DOCUMENTS

| | | | | |
|---|---|---|---|---|
| 5,715,354 A | * | 2/1998 | Iwamura et al. | ............... 386/68 |
| 6,075,920 A | * | 6/2000 | Kawamura et al. | ........... 386/95 |
| 6,249,854 B1 | * | 6/2001 | Fukuhisa et al. | ............ 711/218 |
| 6,473,558 B1 | * | 10/2002 | Wu et al. | ...................... 386/68 |
| 6,480,666 B1 | * | 11/2002 | Wilson et al. | ................. 386/70 |
| 6,510,554 B1 | * | 1/2003 | Gordon et al. | ................. 725/90 |
| 6,539,164 B2 | * | 3/2003 | Shirakawa et al. | ........... 386/70 |
| 6,654,539 B1 | * | 11/2003 | Duruoz et al. | ................. 386/68 |

FOREIGN PATENT DOCUMENTS

| | | | | |
|---|---|---|---|---|
| EP | 0667713 | | 8/1995 | .......... H04N/5/926 |
| EP | 0729153 | | 8/1996 | ............ G11B/27/32 |
| EP | 0735780 | | 10/1996 | .......... H04N/9/804 |
| EP | 0753974 | | 1/1997 | .......... H04N/9/804 |
| EP | 0756281 | * | 1/1997 | |
| EP | 0866461 | | 9/1998 | ........... G11B/27/10 |
| JP | 407212768 A | * | 8/1995 | ............ H04N/7/32 |
| JP | 8-079710 | | 3/1996 | .......... H04N/5/937 |

OTHER PUBLICATIONS

Patent Abstracts of Japan, vol. 1996, No. 07, Jul. 31, 1996 and JP 8–079710.

* cited by examiner

*Primary Examiner*—Chris Kelley
*Assistant Examiner*—Jamie Vent
(74) *Attorney, Agent, or Firm*—Joseph S. Tripoli; Harvey D. Fried; Christine Johnson

(57) ABSTRACT

The invention proposes a method for reverse playback of a digital data stream representing video information. The information is stored in an Intra picture coded format followed by several Non-Intra coded pictures. For reverse playback n sectors are jumped back from the actual scanning position. The location of the n sectors is read in forward direction. A sector location list is created. The sector location list is resorted to a reverse order. The position of sector stream is parsed according to the sector location list in order to find appropriate position of start codes of the video information. Digital data stream from position of start codes is delivered to a following processing unit.

9 Claims, 3 Drawing Sheets

PickUp

InputQueue

Figure 1:
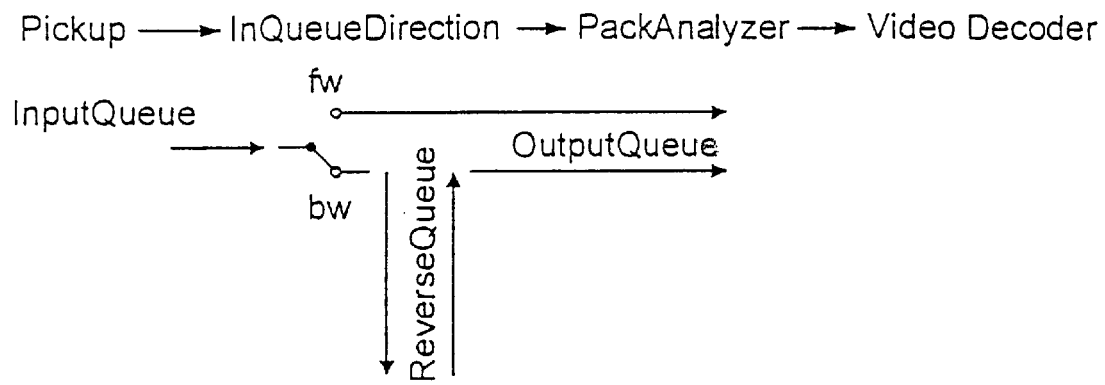

InQueueDirection a) request sector stream b) read in ReverseQueue c) resort d) OutputQueue e) request sector stream ( starting from 1 - 7 = -6 )

InputQueue

METHOD AND APPARATUS FOR REVERSE PLAYBACK OF A DIGITAL DATA

The invention relates to a method and an apparatus for reverse playback of a digital data stream representing video information.

BACKGROUND

For processing a digital data stream, which is e. g. Video CD MPEG 1 coded, a sequence of a consecutive sector stream will be provided by a Pickup, retrieving these sectors from a disc. For trick mode the MPEG I standard ISO/IEC 11172 "Coding of moving pictures and associated audio for digital storage media at up to about 1,5 Mbit/s" Part 2: Video supports features by an algorithm for fast search and reverse playback.

For fast search, depending on the storage medium, it is known to scan the access points in coded bitstreams—with the help of an application-specific directory or other knowledge beyond the scope of this part of ISO/IEC 11172—to obtain a fast-forward and fast-reverse playback effect.

Some applications may require the video signal to be played in reverse order. This can be achieved in a decoder by using memory to store entire groups of pictures after they have been decoded before being displayed in reverse order. An encoder can make this feature easier by reducing the length of groups of pictures.

In the Video CD specification, Version 2.0, section VII.3 it is recommended to encode Scan Information User_data_ groups. If Scan Information User_data_groups are present, then they must be included as user_data in the picture layer of all Intra pictures. Scan Information data contains forward and backward pointers to Sectors that contain the start of an Intra picture. A file "SCANDATA.DAT" must then be present on the disc. However, the Scan Information User_ data_groups is not often used.

In order to provide backward trick modes in case the Scan Information User_data_groups is not available one typically implementation is known:

1-jump n sectors backwards
2-decode next pictures from new starting point
3-display only I Frames
1-jump again The digital data stream of an e. g. Video CD MPEG 1 coded is organized in at least Group of Pictures (GOP) and Sectors. GOP starts usually with an Intra picture followed by several Non-Intra pictures. The number of Non-Intra pictures could be fixed or variable. Therefore, since step 2 is just a 'show me the I Frames in a certain sequence portion' it might happen that two Intra pictures will get displayed which are in the wrong order for a backward trick mode.

Displaying preceding I Frames in a step by step manner using a jump back scheme will not be smooth because of not regular sectors per GOP structure.

INVENTION

It is an object of the present invention to disclose a method, which allows stepping backwards displaying each consecutive picture.

According to the invention, this object is achieved by means of the features specified in main claims. Advantageous designs and developments are specified in subclaims.

According to the invention for processing a real backward trick mode the sectors coming from the Pickup are resorted to a reverse order. A parser algorithm is then searching the next Intra picture start and if found will queue only the appropriate Intra picture sectors to a Video Decoder.

In particular the inventive method for reverse playback of a digital data stream representing video information, this information being stored in an Intra picture coded format followed by several Non-Intra coded pictures, the video information being organized in sectors containing a fixed number of bytes, includes the following steps:

jumping back n sectors from the actual scanning position, reading an address information of the n sectors in forward direction, creating therefrom a sector location list, resorting the sector location list to a reverse order, parsing the position of sector stream according to the reversed sector location list in order to find appropriate position of start codes of the video information, delivering the digital data stream from this position to a following processing unit.

Since the position of an Intra picture start is now known it is possible to a) request a new sector stream which will be definitely preceding the current Intra picture and b) request a new sector stream which will be definitely consecutive to the current Intra picture.

For performing a real backwards parsing a new scheme of start code parsing for detecting overlapped start codes has to be used.

The invention provides a stepwise backwards trick mode which is not common on Video CD players. Also, it provides the display of consecutive Intra pictures in backward trick modes.

DRAWINGS

Figure 2:
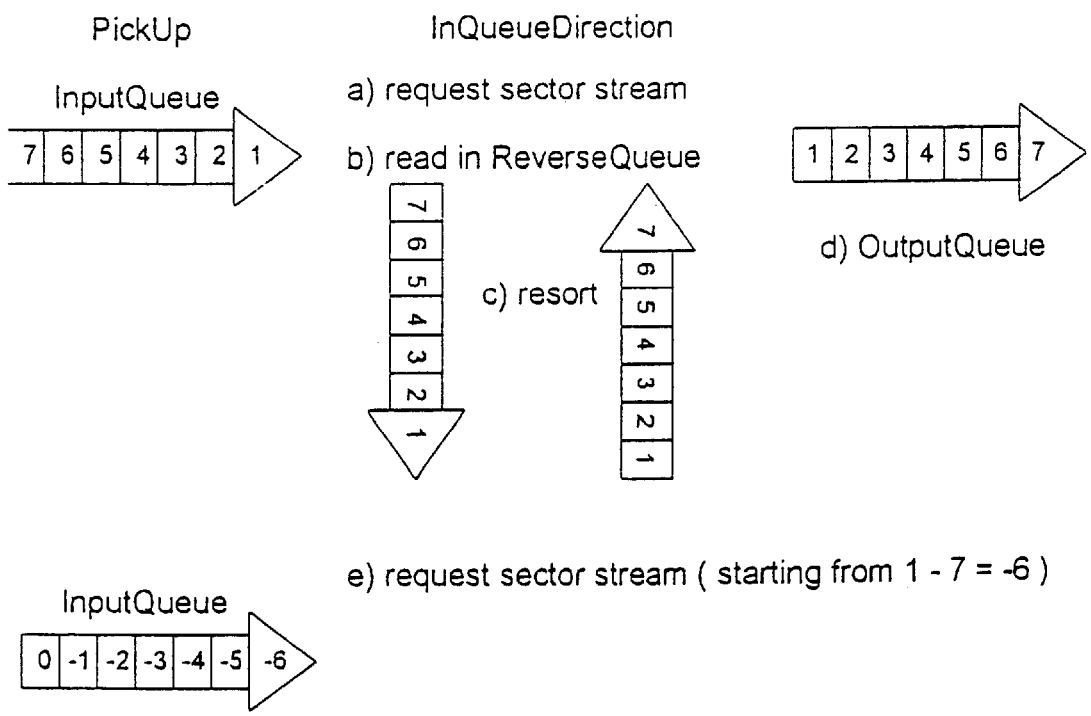

Embodiments of the invention are described with reference to the accompanying drawing, which show in:

FIG. 1 Queue structure;

FIG. 2 parsing through the sector stream

Figure 3:
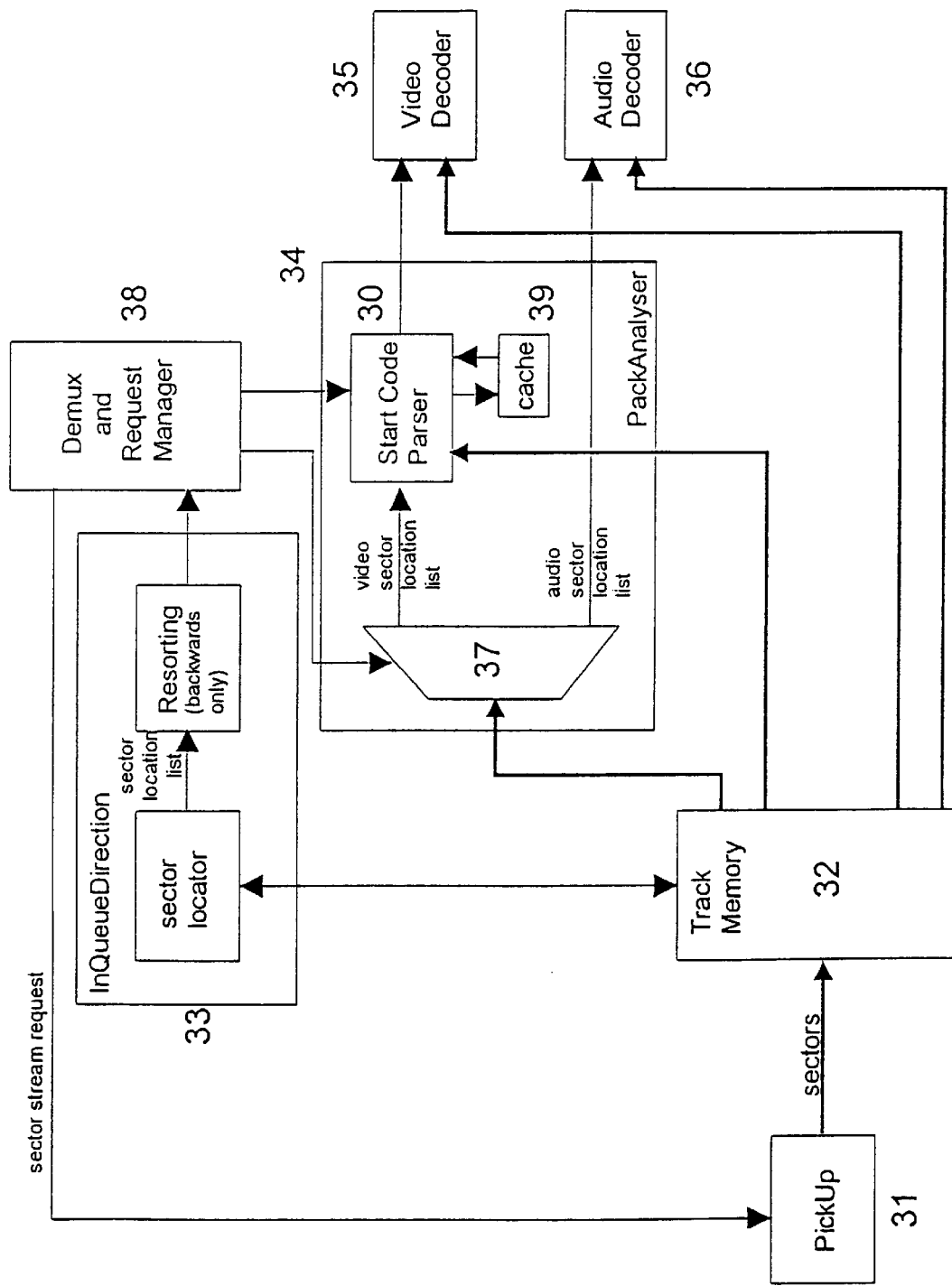

FIG. 3 Reverse playback apparatus for a digital data stream

Figure 4:
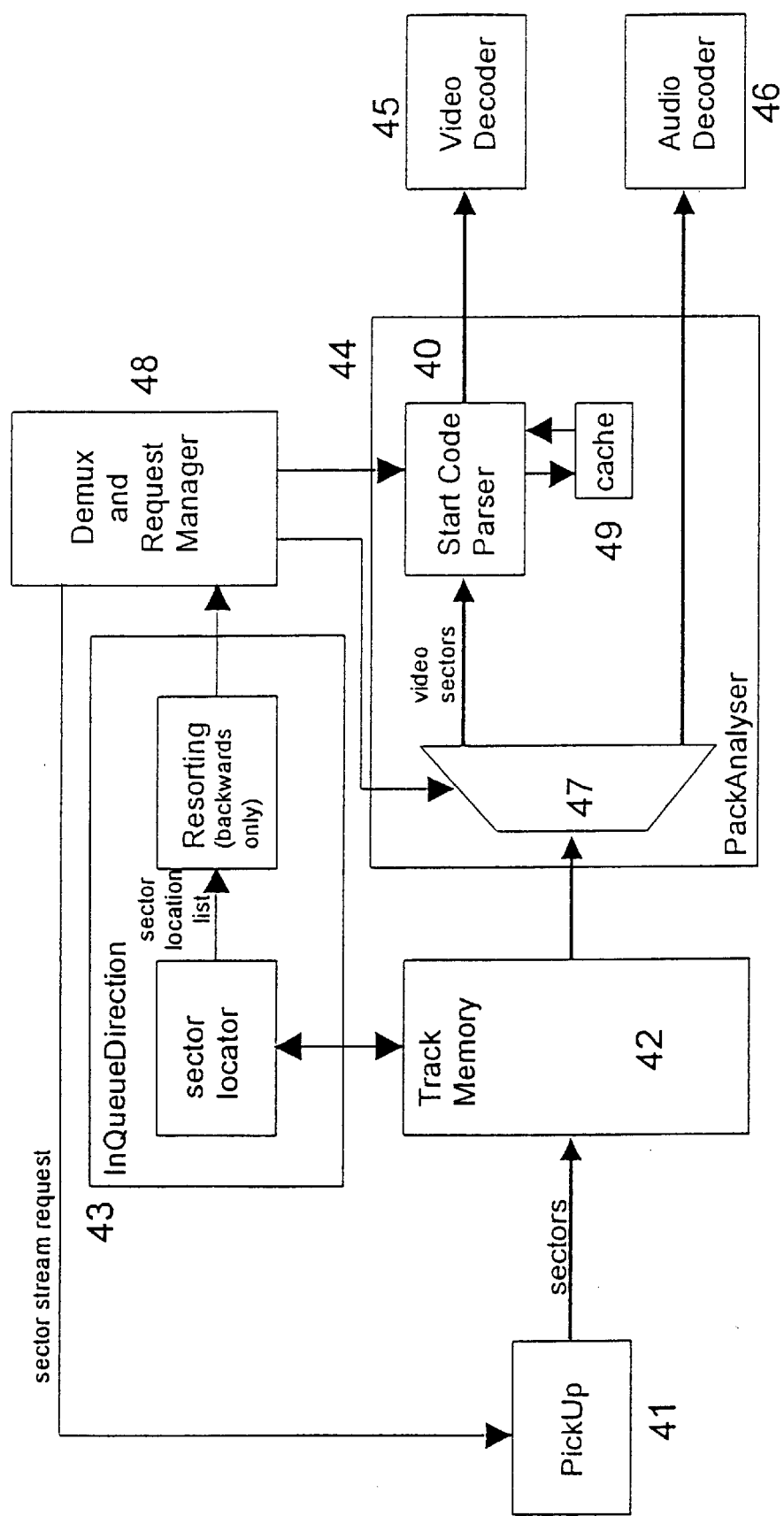

FIG. 4 Second embodiment of an apparatus for reverse playback of a digital data stream

EXEMPLARY EMBODIMENTS

Exemplary embodiments of the invention are explained in more detail in the following description.

FIG. 1 shows a queue structure of one embodiment of the invention. Received from a pickup an InputQueue is produced. In case of forward display a fw path is used to connect the InputQueue directly with an OutputQueue, which leads to a Video Decoder for image processing. In case of backward trick mode the InputQueue is redirected through a switch in bw position in order to create a ReverseQueue, which performs the OutputQueue.

For backward trick modes preceding Intra pictures are needed to be displayed. Basically this is ensured by parsing backwards through the sequence of sectors. Therefore, the invention consists of two stages:

a) resorting the sector stream to a reverse order and b) parsing through the sector stream.

This process needs a handling of possible sector overlapped MPEG start codes which is different to common forwards parsing. This is described in more detail in the following.

Resorting the sector stream to a reverse order FIG. 1 shows one possible implementation using Queue structures.

These queues are pointer lists of the memory locations of sectors—CDROM sectors for Video CD—. Each sector structure contains a further memory pointer—sector->next—which connects consecutive sectors. By resorting these connectivity pointers it is possible to arrange a continuous sector stream of reverse order.

In a preferred implementation of the invention an InQueueDirection process is requesting a continuous sector stream from the Pickup. A number of n sectors are listed in the ReverseQueue for resorting. For example the number n can be set to 50 if the maximum memory has space for 200 sectors. After filling this ReverseQueue the containing sectors, i.e. the represented sector pointers, are passed to the OutputQueue in which they are available for further processing. When the ReverseQueue is empty again, the InQueueDirection will request sectors starting from the last sector ID which was queued into the ReverseQueue minus ReversQueue size n. This is shown in FIG. 2.

FIG. 2 shows an example of parsing through the sector stream. Parsing through this sector stream ensures that only preceding start codes will get detected, provided that these start codes are located in separate sectors. Additional provisioning is needed to distinguish the order of several start codes in one sector. This is especially needed for detecting boundaries of B-Frames which might be even smaller than half of one sector for MPEG 1 video sequences. It is further possible to build up a preparsed GOP history for additional backward trick modes.

In order to describe this processing in more detail it is required to distinguish between these stages:
b1. Start Code Parsing
b2. Intra picture Sector caching to b1. Parsing for Start Codes is the general search for 00.00.01.xx within the sector shown as hexadecimal byte sequence. For detecting even the type of the Start Code it is required to analyze all 4 bytes. This Start Code might overlap the current sector. So, depending on the parsing direction (backwards/forwards) the first/last word of the previous/next sector has to be included in the sector parsing process. An example implementation ensures this by storing the first/last word during the analysis of the current sector for recognizing overlapped Start Code.

to b2. If an Intra picture Header has been detected all previously queued sectors are already Intra picture sectors. So, either a request for a forwards queued sector stream has to be issued, starting by the sector ID with the Intra picture Header inside or all previous sectors have to be cached. In the example implementation a cache for the previous sectors is implemented. This cache will be filled as long as no further Start Code has been found, or flushed if a Start Code has been found which is not an Intra Picture Header, or queued to the Video Decoder, when an Intra Picture Header has been found.

Finally, if an Intra picture based fast backward trick mode has been requested, a jump to a preceding sector location has to be done next.

If the requested mode has been single step backwards a PackAnalyser will just continue parsing the proceeding sectors according the incoming sector stream.

FIG. 3 shows a first embodiment of a reverse playback apparatus for a digital data stream. In said apparatus a pick-up 31 controlled by a demux and request manager device 38 with a sector stream request supplies a track memory 32 with digital information, received from a disk. The track memory 32 is connected via a bi-directional control line with an InQueueDirection circuit including a sector locator, which creates a sector location list, which is forwarded to a resorting device in backwards mode. The content of the resorting device is fed to the demux and request manager device 38. The track memory has four output. A first output is connected to a PackAnalyser device 34 with a demux 37 feeding on its first output a video sector location list to a Start Code Parser 30 and on its second output a audio sector location list to a Audio Decoder 36. The Start Code Parser 30 content is cached in a cache memory 39. An output of the Start Code Parser 30 is connected to a Video Decoder 35.

A second output of the Track Memory 32 is connected to the Start Code Parser 30. A third and forth output of the Track Memory 32 feeds the video or audio content to the Video Decoder 35 or Audio Decoder 36, respectively.

The sector location list resorting and the start code parsing is supposed to be executed in separate processes in order to allow a high average sector feeding rate to the following processing units Video Decoder 35 or Audio Decoder 36.

FIG. 4 shows a second embodiment of a reverse playback apparatus for a digital data stream. In this embodiment a Start Code Parser 40 works directly on the video sectors. The caching is performed in a cache 49. The video sectors are loaded by the Start Code Parser 40 from the Track Memory 42 and transferred to the cache 49 and from there to the Video Decoder 45.

What is claimed is:

1. Method for reverse playback of a digital data stream representing video information, this information being stored in an Intra picture coded format followed by several Non-Intra coded pictures, the video information being organized in sectors containing a fixed number of bytes, Including the following steps:

jumping back n sectors from the actual scanning position, reading an address information of the n sectors in forward direction, creating there from a sector location list, resorting the sector location list to a reverse order, parsing the position of sector stream according to the reversed sector location list in order to find appropriate position of start codes of the video information, delivering the digital data stream from this position to a following processing unit.

2. Method according to claim 1, wherein the parsing is performed on a sequence header and/or start code of an Intra picture.

3. Method according to claim 2, wherein depending on the parsing direction backwards or forwards the first or last word of the previous or next sector is included in the sector parsing process.

4. Method according to claim 3, wherein the first or last word is stored during the analysis of the current sector for recognizing overlapped start code.

5. Method according to claim 2, wherein in case a sector has been parsed for start codes the sector and/or the sector location pointer will get cached whereby the cache will be:

filled as long as no further start code has been found, or flushed if a start code has been found which is not an Intra Picture Header, or queued to a video decoder, when an Intra Picture Header has been found.

6. Method according claim 2, wherein in order to playback a non-Intra coded picture a loading and decoding of an Intra picture is performed followed by loading and decoding of n non-Intra coded pictures and displaying the desired non-Intra coded picture.

7. Apparatus for reverse playback of a digital data stream representing video information including:

- means for jumping back n sectors from the actual scanning position,
- means for reading an address information of the n sectors in forward direction,
- means for creating therefrom a sector location list,
- means for resorting the sector location list to a reverse order,
- means for parsing the position of sector stream according to the sector location list in order to find appropriate position of start codes of the video information,
- means for delivering the digital data stream from this position to a following processing unit.

8. Apparatus according claim 7, including means for establishing a cache for previously parsed sectors by either using a separate memory or a track memory.

9. Apparatus according claim 7, including means for establishing a cache for the previously parsed sector pointers.

* * * * *

UNITED STATES PATENT AND TRADEMARK OFFICE
CERTIFICATE OF CORRECTION

| | |
|---|---|
| PATENT NO. | : 6,804,450 B1 |
| APPLICATION NO. | : 09/573658 |
| DATED | : October 12, 2004 |
| INVENTOR(S) | : Kochale |

Page 1 of 1

It is certified that error appears in the above-identified patent and that said Letters Patent is hereby corrected as shown below:

On the Abstract "Under (54) Method and Apparatus for Reverse Playback of a Digital Data." should read -- Method and Apparatus for Reverse Playback of a Digital Data Stream.--.

Signed and Sealed this

Fourth Day of September, 2007

JON W. DUDAS
*Director of the United States Patent and Trademark Office*